United States Patent [19]

Yoshida et al.

[11] 4,230,735

[45] Oct. 28, 1980

[54] PROCESS FOR PRODUCING QUICK-COOKING NOODLES

[75] Inventors: Kiyotaka Yoshida, Tokorozawa; Yoshio Hatanaka, Akikawa; Kesayoshi Kudo, Tokyo; Takao Aoki, Tokyo, all of Japan

[73] Assignee: Myojo Foods Company, Limited, Tokyo, Japan

[21] Appl. No.: 890,142

[22] Filed: Mar. 27, 1978

[30] Foreign Application Priority Data

Mar. 29, 1977 [JP] Japan .................................. 52/34950

[51] Int. Cl.² .............................................. A23L 1/16
[52] U.S. Cl. .................................. 426/557; 426/113; 426/451
[58] Field of Search ............... 426/557, 451, 503, 113, 426/511, 524, 601

[56] References Cited

U.S. PATENT DOCUMENTS

| | | | |
|---|---|---|---|
| 2,669,195 | 2/1954 | Pellegrino | 426/451 |
| 2,677,613 | 5/1954 | Shiah | 426/557 |
| 3,138,462 | 6/1964 | Katz et al. | 426/451 |
| 3,846,563 | 11/1974 | Cunningham | 426/557 |
| 3,997,676 | 12/1976 | Ando | 426/557 |
| 4,098,906 | 7/1978 | Hisaki et al. | 426/557 |

FOREIGN PATENT DOCUMENTS 37-24137  8/1962  Japan ............................... 426/557

Primary Examiner—Joseph M. Golian
Assistant Examiner—Elizabeth A. Hatcher
Attorney, Agent, or Firm—Oblon, Fisher, Spivak, McClelland & Maier

[57] ABSTRACT

In accordance with the present invention, there is provided an improved process for producing a quick-cooking noodle without frying treatment. The process is especially suitable for producing a quick-cooking snack noodle. Noodle formulations containing starch flour and edible fat and/or oil in addition to wheat flour and/or buckwheat flour, egg powder, salt, water and a noodle dough conditioner are mixed, rolled into a continuous noodle sheet, which is then slit into noodle strands, followed by steaming. Thereafter, the steamed noodle strands are cooled to within 30°–60° C. by blowing cold air, dried and then packaged together with flavoring agents and additives, preferably in a suitable insulating container.

14 Claims, No Drawings

PROCESS FOR PRODUCING QUICK-COOKING NOODLES

BACKGROUND OF THE INVENTION

The present invention relates to an improvement in a process for producing quick-cooking noodles. More particularly, the present invention relates to an improvement in a process for producing quick-cooking snack noodles by which only steaming, without frying treatment, is used to convert the starch in the noodles to α type.

DESCRIPTION OF THE PRIOR ART

The conventional quick-cooking noodles have been produced by adding water, egg powder, salt and noodle dough conditioner to wheat flour and/or buckwheat flour, mixing them homogeneously, rolling the mixture to make a continuous noodle sheet, subsequently slitting the sheet into noodle strands, steaming the strands and cutting them into a predetermined length followed by frying them to accomplish at the same time the conversion of the starch in the noodles into α type and dehydration, and finally packaging them after cooling. However, with such conventional noodles there is a problem of deterioration arising from the oil absorbed in or adsorbed onto the noodle strands after frying. In other words, after a long lapse of time, proxides are sometimes produced by the deterioration of the oil used for the frying treatment of the strands, and the peroxides produced by the deterioration of the oil are harmful to human health. Furthermore, the quality of the product is often ruined by the rancid taste or odor due to the deteriorated product. Therefore, the recent trend has been to convert the starch in the noodles into α type by only steaming, without frying, and subsequently dry them in a mold or bucket using hot air, micro waves, high-frequency waves, or the like., thus avoiding the above-mentioned disadvantages inherent in the ordinary fried noodles.

However, although conventional quick-cooking noodle formulations, i.e., a mixture comprising wheat flour and/or buckwheat flour, egg powder, water, salt and noodle dough conditioners, may be made edible by boiling in a pan over an open flame, they have proven unsuitable for use in the quick-cooking snack noodles that are packaged in disposable insulating bowls or cups made of, for example, foamed polystyrol and which are made edible by pouring boiling water in the containers and allowing to stand for three or four minutes. The reason is that the noodles which are produced from noodle formulations comprising wheat flour and/or buckwheat flour, egg powder, water, salt and noodle dough conditioners by only steaming without frying to convert the starch in the noodles into α type can hardly be made edible simply by pouring boiling water and allowing to stand for a few minutes.

SUMMARY OF THE INVENTION

Therefore, it is an object of the present invention to provide a process for producing noodles that are quickly made edible, have better mouthfeel and good processability and suitable for use either as quick-cooking noodles or as quick-cooking snack noodles.

Throughout the specification and the claims, the term "quick-cooking noodles" means a type of food which is made edible by simple short cooking. The main ingredient of such noodles is usually wheat flour and/or buckwheat flour to which is added egg powder, water, salt and noodle dough conditioners to make a noodle dough which is rolled into a sheet which is slit into noodle strands, steamed to convert the starch in the noodle strands into α type, drying the noodle strands by an appropriate method, adding flavoring agents directly to the noodles or alternatively attaching a separate package of flavoring agents to the noodles to be added at the time of eating and optionally adding directly additives such as spices and dehydrated vegetables, meats, egg, fish, or the like to the noodles or attaching a package containing such additives. The flavoring agents include two or more ingredients selected from meat extracts, vegetable extracts, seaweed extracts, salt, soy sauce, sodium glutamate, sugar, fats and oils, vinegar, spices, "miso", milk, sauce or the like. The flavoring agents may be in the form of powder, paste or liquid.

The term "quick-cooking snack noodles" means a type of food which consists of the aforementioned quick-cooking noodles, flavoring agents and additives to be eaten directly from the container which serves both as a cooking pot and a bowl or cup. The noodles are made edible simply by pouring boiling water in the container and allowing to stand for a few minutes. Examples of such noodles are quick-cooking Chinese noodles (Rao-mien), quick-cooking chow mein, quick-cooking buckwheat noodles (referred to as "Soba" in Japanese), quick-cooking Japanese noodles (referred in as "Udon" in Japanese), and the like.

The term "noodle dough conditioner" means that which improves elasticity, expandability and texture of noodles. A representative example of "noodle dough conditioner" used in the present invention is "kansui". "Kansui" is a saturated aqueous solution of sodium carbonate ($Na_2CO_3$), potassium carbonate ($K_2CO_3$), sodium bicarbonate ($NaHCO_3$) or a mixture thereof and is usually alkaline. Other examples of dough conditioner are gums such as guar gum, locust bean gum and tamarind seed gum, alginic acid, pectin, polyphosphate and the like. The noodle formulations according to the present invention contain, as basic ingredients, wheat flour and/or buckwheat flour, water, salt, egg powder, noodle dough conditioner and further contain starch flour and edigle flat and/or oil. It is well known in the art to vary ingredients according to the type and taste of noodles desired. In the case of quick-cooking Chinese noodles, for instance, "kansui" must be used as a noodle dough conditioner, whereas in the case of quick-cooking buckwheat noodles, it is necessary to add buckwheat flour in addition to wheat flour and it is not necessary to add "kansui". If necessary, the noodle formulation may further include other ingredients such as, for example, vegetable albumin, enriching agents such as Vitamin $B_1$, Vitamin $B_2$ and the like, natural food dye, e.g., β-carotene, anti-oxidizing agents, lecithins, D-sorbitol. The specifications for these noodles, flavoring agents and additives are established and provided in the Japanese Agriculture and Forestry Standard for quick-cooking noodles published by the Ministry of Agriculture and Forestry.

We have accomplished the present invention based on the discovery that the above-mentioned disadvantages in the production of quick-cooking noodles can be eliminated by adding water, salt, egg powder, and noodle dough conditioner to the main ingredient, wheat flour and/or buckwheat flour, adding thereto at least one starch flour and at least one edible fat and/or at least one edible oil in amounts of from about 15% to 50% and from about 0.4% to about 4% by weight, respectively, based on the total weight of the ingredient flours consisting of the wheat flour and/or the buckwheat flour and the starch flour in the formulations, kneading and rolling into a continuous noodle sheet, slitting the sheet into strands, steaming the strands, separating them while cooling to a temperature of from about 30° to about 60° C. by blowing cold air, and subsequently cutting into a predetermined length, packing each in a mold or bucket and drying them, thereafter packaging the resulting noodle clump together with the flavoring agents and the additives.

DETAILED DESCRIPTION OF THE PREFERRED EMBODIMENTS

In the present invention, addition of starch flour to wheat flour and/or buckwheat flour makes the noodles easier to cook and imparts elasticity and smoothness to the cooked noodles. Although the reason has not been clarified, it was found that the noodles to which starch flour has been added are more quickly made edible than those without starch flour. Examples of starch flours which can be used in the present invention are those having a low gelatinization temperature such as potato starch, sweet potato starch, glutinous rice starch, manioc tapioca and a mixture thereof. Those that have a higher consistency are preferred, and potato starch flour is the most preferred starch in the practice of the present invention. Other cereal starches may also be used. The amount of starch to be added in the present invention can vary from about 15% to about 50%, preferably about 30% to about 40% by weight based on the total weight of the ingredient flours employed in the formulations. When the amount of starch is less than 15% by weight, the resulting noodles are not so tasty, because they swell too rapidly, have a mealy texture and do not give a smooth mouthfeel. On the other hand, when the amount of the starch added exceeds 50% by weight, noodles cannot be produced since the noodle dough is prone to break during rolling, or gelatinization after steaming is so great that the noodle strands are hard to separate. Therefore, molding drying and cooking with hot water to make edible are not expected to proceed smoothly. However, even when starch is added to wheat flour and/or buckwheat flour in an amount of about 15% to 50% by weight, although the consistency of the mixture of ingredients is enhanced, there sometimes occur such troubles as discontinuity or breaking of noodle sheet or noodle strands during rolling and slitting. Or the noodle strands after steaming are not easily separated, thus making uniform packing in a mold or bucket very difficult.

In this invention, therefore, the usual drawbacks involved in the use of starch can be eliminated by adding edible fat and/or edible oil in an amount of about 0.4% to about 4%, preferably about 0.5% to about 2% by weight based on the total weight of the ingredient flours. The fat and/or oil to be used in the present invention may be any vegetable or animal fat or oil or a mixture of these fats and oils. Examples or vegetable fats and oils are palm oil, soybean oil, colza oil, cotton seed oil, corn oil, sesame seed oil, peanut oil, olive oil, hardened oils thereof, a mixture thereof and so on. Examples of animal fats and oils are whale oil, hardened whale oil, lard, tallow, mutton tallow, a mixture thereof, and the like. In the practice of the present invention, it is preferable to use palm oil, lard or a mixture thereof. The aforementioned drawbacks caused by starch cannot be overcome when the amount of the fat and/or oil is less than 0.4% by weight, whereas addition of the fat and/or oil in an amount exceeding 4% by weight renders the resulting noodles a little hard and the pliability and crispness of the cooked noodles are impaired, because, after pouring boiling water in the container to make the noodles edible, some time elapses. It can also happen with too much the fat and/or oil that the fat and/or oil coming up to the surface of the noodle strands is subjected to oxidation by air and releases an offensive odor. As the temperature during the drying step is relatively high (80° C. or more), the oil on the surface of the noodle strands is susceptible to rancidity. Therefore, when the addition of the fat and/or oil exceeds 4% by weight, the advantages as non-fried noodles cannot be expected.

In the present invention, the noodle strands coming out of the steaming means are separated while being cooled with cold air. This cooling treatment is continued until the temperature of the steamed noodle strands is lowered to the range of about 30° to about 60° C., preferably about 30° to about 40° C. The separating operation is performed by mounting the strands on a carrier conveyor running at a higher speed than that of the transfer conveyor of the steaming means. By both operations, stickiness of the strands after steaming is prevented and uniform molding and packing are possible. When the temperature is higher than 60° C., cooling is not adequate. Above 60° C., the starch is still in the gelatinized condition, and the steamed noodle strands stick to one another to impair processability. On the other hand, if the temperature is below 30° C., the noodle strands lose appropriate elasticity and expandability.

The process of the present invention can be conducted by using any conventional apparatus used for the manufacture of quick-cooking noodles. For example, wheat flour and/or buckwheat flour, edible fat and/or edible oil, starch flour, salt, water, egg powder, noodle dough conditioner, and other necessary ingredients for the noodle in the prescribed amounts are mixed in any type of a kneader, e.g., longitudinal type, transverse type, for a short time. The noodle dough coming out from the kneader is passed through two sets of first rollers at the same time and the two continuous noodle sheets coming out of the rollers are passed through a second roller to combine them and give a thicker continuous noodle sheet which is further passed through a nip roller to make the thickness suitable for slitting and then the sheet is continuously slit into noodle strands by a slitter. The noodle strands are then forwarded to a steamer where the starch in the noodles is converted into α type. The strands are mounted on a carrier conveyor running at a higher speed than that of a transfer conveyor of the steamer, while blowing cold air onto the noodle strands by an electric fan or a blower to cool the strands to the predetermined temperature range. Thereafter, the noodle strands are cut into a predetermined length, packed in molds or buckets, dried and finally packaged, preferably in a suitable insulating disposable cup or bowl shaped container, to give a product. As explained above, there are no problems with non-fried, quick-cooking noodles produced only by steaming the noodle strands according to the conventional noodle formulations as they are cooked in a pan over an open flame, but when they are packaged as quick-cooking snack noodles in an insulating cup or bowl shaped container and are to be served a short time (3-4 minutes) after pouring boiling water in the container, they cannot be made satisfactorily edible and furthermore, the strands stick to each other during the production process, which makes them unsatisfactory for use as quick-cooking snack noodle. On the other hand, in the present invention, the noodles produced contain from about 15% to about 50% by weight of starch flour and about 0.4% to about 4% by weight of edible fat and/or edible oil in addition to ordinary wheat flour and/or buckwheat flour, water, salt, egg powder and noodle dough conditioner and can be made edible either by boiling in a pan over an open flame or simply by pouring hot water over the noodles in a disposable insulating bowl or cup shaped container and allowing to stand for 3-4 minutes. The noodle formulations used in the present invention not only produce noodles which are quickly made edible but also gives noodles of better quality and better texture. Also, according to the present invention, sticking of the continuous noodle sheet to the rolls during rolling is prevented. Moreover, the noodle strands after steaming can be easily separated and thus, sticking of the steamed noodle strands to each other is avoided. As a result, packing of a prescribed amount in a mold or bucket is facilitated and noodle clumps of better shapes are obtained, thus enhancing the commercial value of the product. Furthermore, as the noodle strands do not stick to each other, each noodle strand is made equally edible when immersed in hot water.

The process of the present invention is especially suitable for producing the quick-cooking snack noodles in which the noodle clump is put into a disposable container made of an insulating material and usable as a cooking and serving bowl or cup and made edible by pouring hot water in the container and allowing to stand for a short time. However, the process of the present invention is not limited to the above process but is also applicable for producing the quick-cooking noodles which require a simple and short cooking operation such as boiling in a pan over an open flame. In the latter case, much less time is required for making the noodles edible than for the quick-cooking snack noodles.

The present invention is illustrated by the following examples, which are given merely for explanatory purpose and should not be construed to be limiting.

EXAMPLE 1

In this example, quick-cooking snack Chinese noodles were prepared. Ingredients consisting of 700 gm. of wheat flour, 300 gm. of potato starch flour, 340 ml. of water, 4 gm. of "kansui", 10 gm. of lard, 1 gm. of guar gum, 4 gm. of egg powder and 20 gm. of salt were kneaded in a transverse type mixer for 17 minutes, and according to the conventional manner, the mixture was rolled into a sheet and then slit into noodle strands of 0.9 mm in thickness by using a slitter means provided with No. 20 rectangular slots. The noodle strands were then passed through a steaming means to convert the starch in the noodles into α type. Thereafter, the strands were mounted on a carrier conveyor provided with an electric fan for blowing cold air from both upper and lower sides of the conveyor to lower the temperature of the noodle strands to 40° C. Near the end of the conveyor, the noodle strands were cut into one-meal portions of about 90 gm. each, put into molds and dried by hot air. The weight of this one-meal portion was about 60 gm. after drying. The resulting noodle clump was put into a 650 ml. insulating container of China bowl shape and the flavoring agents and additives were added thereto. 550 ml. of hot water at a temperature of about 100° C. was poured in the container which was covered and allowed to stand for about 4 minutes. Then, the lid was removed, and the contents of the container was thoroughly stirred before eating. The noodles thus produced were tested by a taste panel. Also in this example, suitability for and difficulties encountered in noodle manufacture were observed throughout the steps from kneading to drying. The results are shown in Tables I and II below.

EXAMPLE 2

Quick-cooking snack Chinese noodles were produced according to the procedures in Example 1 except that the amount of wheat flour was 800 gm. and the amount of potato starch flour was 200 gm. Suitability for and difficulties encountered in noodle manufacture were observed and organoleptic tests were carried out. The results are shown in Table I and II below.

EXAMPLE 3

Quick-cooking snack Chinese noodles were produced according to the procedures in Example 1 except that the amount of wheat flour was 600 gm. and the amount of potato starch flour was 400 gm. Suitability for and difficulties encountered in noodle manufacture were observed and organoleptic tests were carried out. The results are shown in Tables I and II below.

EXAMPLE 4

Quick-cooking snack Chinese noodles were produced according to the procedures in Example 1 except that the amount of wheat flour was 500 gm. and the amount of potato starch flour was 500 gm. Suitability for and difficulties encountered in noodle manufacture were observed and organoleptic tests were carried out. The results are shown in Tables I and II below.

TABLE I

Relationship between the amount of starch flour added and suitability for and difficulties encountered in noodle manufacture

| Example No. | Amount of starch flour added (% by weight) | Evaluation |
|---|---|---|
| 2 | 20 | A |
| 1 | 30 | A |
| 3 | 40 | B |
| 4 | 50 | C |

Notes:
A suitable for noodle manufacture: easy to work with; gives a good product
B suitable for noodle manufacture: some difficulty in using; gives a fair product
C suitable for noodle manufacture: rather difficult to work with; product is not so good.

Table II

Relationship between the amount of starch flour added and organoleptic response

The noodles produced according to the procedures in Examples 1-4 were tested by a panel consisting of 20 panelists. The average evaluations by these panelists are marked in 4 ranks of A-D.

| Object of evaluation | Amount of starch added (% by weight) | | | | |
|---|---|---|---|---|---|
| | 20 | 30 | 40 | 50 | Control |
| Smoothness of the noodles | C | A | A | A | D |
| Elasticity | C | A | A | B | D |

-continued

| Object of evaluation | Amount of starch added (% by weight) | | | | |
|---|---|---|---|---|---|
| | 20 | 30 | 40 | 50 | Control |
| Edibility | C | B | A | B | D |
| Total evaluation | C | A | A | B | D |

Notes:
A excellent
B good
C fair
D poor

The control was noodles produced without addition of the starch flour and the fat and/or oil and without cooling treatment after steaming.

EXAMPLES 5-7

In example 1, the quick-cooking snack Chinese noodles were produced by adding 30% by weight of potato starch flour. In these examples, changes in the organoleptic influence when different kinds of starch flour added were used were tested by 20 panelists and the results are shown in Table III in which only total organoleptic evaluation is presented.

TABLE III

| | Relationship between kind of starch flour and organoleptic response | | |
|---|---|---|---|
| Example No. | Kind of starch flour | Added amount (% by weight) | Organoleptic evaluation |
| 1 | potato starch | 30 | A |
| 5 | sweet potato starch | 30 | B |
| 6 | manioc tapioca | 30 | B |
| 7 | corn starch | 30 | C |

Notes:
A excellent
B good
C fair

EXAMPLES 8-10

In these examples, the amount of fat was changed but the amount of potato starch flour was kept at 30% by weight. Namely, the amounts of lard added were 0.4, 1, 2 and 4% by weight, respectively, and then procedures similar to those in Example 1 were carried out to produce noodles for tests. The taste panel test was carried in the same way as in Example 7. The results are shown in Tables IV and V.

TABLE IV

| | Relationship between the amount of lard added and suitability for noodle manufacture | |
|---|---|---|
| Example No. | Amount of lard added (% by weight) | Total evaluation of suitability for noodle manufacture |
| 8 | 0.4 | C |
| 1 | 1 | A |
| 9 | 2 | A |
| 10 | 4 | A |

Notes:
A Excellent for noodle manufacture
B Satisfactory for noodle manufacture
C Not satisfactory for noodle manufacture. Considerable breaking occurs, binding is poor, and strands are difficult to separate after steaming.

TABLE V

| | Relationship between the amounts of lard added and organoleptic response | |
|---|---|---|
| Example No. | Amount of lard added (% by weight) | Total evaluation of organoleptic response |
| 8 | 0.4 | A |
| 1 | 1 | A |

TABLE V-continued

| | Relationship between the amounts of lard added and organoleptic response | |
|---|---|---|
| Example No. | Amount of lard added (% by weight) | Total evaluation of organoleptic response |
| 9 | 2 | B |
| 10 | 4 | C |

Notes:
A excellent
B good
C fair

EXAMPLE 11

Quick-cooking snack Chinese noodles were produced according to the procedures in Example 1 except that the noodle strands coming out of the steamer were cooled to 30° C. on a carrier conveyor. The appearance of the dried noodles and the separation of the noodle strands after standing in hot water were observed. The temperature of the noodle strands was measured by inserting a thermometer into about 500 gm. of a mass of the cooled noodles. The method of making the noodles edible was the same as in Example 1. The results are shown in Table VI below.

EXAMPLE 12

Quick-cooking snack Chinese noodles were produced in the same way as in Example 11 except that the cooking temperature was 60° C. The appearance of the dried noodles and the separation of the noodle strands after standing in hot water were observed. The results are shown in Table VI below.

TABLE VI

| | Relationship between the cooling temperature, appearance of the dried noodles and their separation when made edible | |
|---|---|---|
| Example No. | Cooling Temp. (°C.) | Evaluation |
| 11 | 30 | B |
| 1 | 40 | A |
| 12 | 60 | C |

Notes:
A excellent in both appearance and separation
B good in both appearance and separation
C fair in both appearance and separation

EXAMPLE 13

Organoleptic tests were carried out on the quick-cooking snack Chinese noodles produced according to the present invention (hereinafter referred to as "P") and the quick-cooking snack Chinese noodles produced according to the conventional method (hereinafter referred to as "Q"). The "P" noodles were produced by the procedures described in Example 1. The "Q" noodles were produced as follows:

Ingredients consisting of 1000 gm. of wheat flour, 4 gm. of "kansui", 1 gm. of guar gum, 4 gm. of egg powder, 20 gm. of salt and 320 ml. of water were kneaded in a transverse type mixer for 17 minutes, rolled into a sheet and slit into noodle strands of 0.9 mm in thickness by using a slitter means provided with No. 20 rectangular slots. The noodle strands were then subjected to steaming treatment to convert the starch in the noodles into α type, cut into a unit of predetermined weight (about 90 gm. each) without cooling, packed in a mold, and finally dried by hot air. The weight after drying was about 60 gm.

The "P" and "Q" noodles were put into 650 ml. containers of foamed polystyrol and having a China bowl shape, respectively, together with flavoring agents and additives. Five hundred and fifty ml. of hot water at a temperature of about 100° C. was poured into each container and, after about 4-minutes standing with their lids on, the lids were removed, the contents were stirred and provided for organoleptic tests. In these tests, the flavoring agents and additives used were the same in both "P" and "Q". The panelists for this test consisted of 20 males and 20 females. The judgements were done by asking which of these two is better in mouthfeel and taste.

| Test results | Numbers |
| --- | --- |
| "P" is superior | 35 |
| "P" is rather better | 4 |
| cannot decide | 1 |
| "Q" is rather better | 0 |
| "Q" is definitely superior. | 0 |
| Total: | 40 |

While certain representative embodiments and details have been shown for the purpose of illustrating the invention, it will be apparent to those having skill in this art that various changes and modifications may be made therein without departing from the spirit or scope of the invention.

We claim:

1. In a process for producing quick-cooking noodles which comprises mixing a noodle formulation comprising a first flour selected from the group consisting of wheat flour, buckwheat flour, and mixtures thereof, salt, egg powder, water and at least one noodle dough conditioner, rolling the mixture to give a continuous noodle sheet, slitting the sheet into noodle strands, steaming the strands, cutting them into a predetermined length, drying them and packaging the resulting noodles as a clump together with flavoring agents and additives, the improvement which comprises that the noodle formulations further integrally contain at least one starch flour and at least one edible fat or one edible oil or mixtures thereof, and that after the noodle strands have been steamed and before they are dried, they are cooled to a temperature of from about 30° to about 60° C., wherein said starch flour is used in an amount of from about 30% to about 40% by weight based on the total weight of the flour ingredients which consist of said first flour and said starch flour; and wherein said edible fat, oil or mixtures thereof are used in amount of from about 0.4% to about 4% by weight based on the total weight of said first flours and said starch flours.

2. The process according to claim 1 wherein the starch flour is selected from the group consisting of potato starch flour, sweet potato starch flour, manioc tapioca flour, glutinous rice starch flour and a mixture thereof.

3. The process according to claim 2 wherein the starch flour is potato starch flour.

4. The process according to claim 1 wherein the edible fat or edible oil or mixtures thereof are selected from the group consisting of vegetable fats and oils, animal fats and oils and a mixture thereof.

5. The process according to claim 4 wherein the vegetable fats and oils are selected from palm oil, soybean oil, colza oil, cotton seed oil, corn oil, sesame seed oil, peanut oil, olive oil, hardened oils thereof or a mixture thereof.

6. The process according to claim 5 wherein the edible vegetable oil is palm oil.

7. The process according to claim 4 wherein the animal fats and oils are selected from lard, tallow, mutton tallow, whale oil, hardened whale oil or a mixture thereof.

8. The process according to claim 7 wherein the edible fat is lard.

9. The process according to claim 1 wherein the edible fat or edible oil or mixtures thereof are used in an amount of from about 0.5% to about 2% by weight based on the total weight of the ingredient flours.

10. The process according to claim 1 wherein after the noodle strands have been steamed and before they are dried, they are cooled to a temperature of from about 30° to about 40° C.

11. The process according to claim 1 wherein said noodles are quick-cooking snack noodles and wherein after the noodle strands have been dried, they are packaged in an insulating disposable container which can be used as a cooking and serving bowl or cup.

12. The process according to claim 1 wherein said first flour is wheat flour.

13. The process according to claim 1 wherein said first said flour is a mixture of wheat flour and buckwheat flour.

14. The noodles produced by the process of the claim 1.

* * * * *